United States Patent [19]
Johnson, Jr.

[11] 4,082,464
[45] Apr. 4, 1978

[54] OPTICAL ANALYSIS SYSTEM HAVING ROTATING FILTERS

[75] Inventor: Robert Lincoln Johnson, Jr., Brattleboro, Vt.

[73] Assignee: Neotec Corporation, Silver Spring, Md.

[21] Appl. No.: 730,677

[22] Filed: Oct. 7, 1976

[51] Int. Cl.² ............................................. G01J 3/50
[52] U.S. Cl. .................................. 356/188; 356/189; 356/201; 356/209; 350/315; 350/318
[58] Field of Search ............... 356/100, 184, 186, 188, 356/189, 201, 209; 350/166, 266, 315, 318

[56] References Cited

U.S. PATENT DOCUMENTS

| | | | |
|---|---|---|---|
| 2,406,318 | 10/1946 | Brace | 350/315 X |
| 2,483,875 | 10/1949 | Boyer | 350/189 X |
| 3,457,002 | 7/1969 | Magrath | 356/100 X |
| 3,492,478 | 1/1970 | Smith | 350/315 X |
| 3,776,642 | 12/1973 | Anson et al. | 356/188 |
| 3,819,276 | 1/1974 | Kiess et al. | 356/184 |
| 3,861,788 | 1/1975 | Webster | 356/188 X |

*Primary Examiner*—F. L. Evans
*Attorney, Agent, or Firm*—Lane, Aitken, Dunner & Ziems

[57] ABSTRACT

In an optical analysis system, six interference filters are mounted on a wheel on a cylindrical locus. The wheel rotates to move the filters in sequence through a beam of light and to vary the angle of incidence of the light to the filters as the filters move through the beam of light so that the wavelength passed by the filters is swept through a range of values. The intensity of light reflected from or transmitted through a test sample is detected to provide an indication of the reflective or transmissive optical density of the test sample at specific wavelengths. The angular position of each of the filters on the wheel is adjustable to make the range of light wavelengths transmitted by each filter adjustable.

9 Claims, 6 Drawing Figures

OPTICAL ANALYSIS SYSTEM HAVING ROTATING FILTERS

BACKGROUND OF THE INVENTION

This invention relates to optical analyzing instruments, and, more particularly, to optical analyzing instruments for testing samples from the reflective or transmissive optical densities of the samples.

The optical density of a sample refers to a transmissive or reflective characteristic of the sample. Transmissive optical density is defined as the logarithm of the ratio of the intensity of incident light on the sample to the intensity of light transmitted through the sample. Reflective optical density is defined as the logarithm of the ratio intensity of the incident light on a sample to the intensity of the reflected light from the sample. U.S. Pat. No. 3,861,788 issued to Donald R. Webster on June 21, 1975, discloses an instrument for analyzing test samples by detecting differences in optical density at selected wavelengths. The specific application for which this instrument is designed is to measure oil, water and protein content in grain samples. In the instrument of the patent, interference filters are mounted in a paddlewheel configuration, which rotates the filters in sequence into a light path between a source of light and the test sample to be analyzed. The paddlewheel arrangement not only moves the filters in sequence into the light path, but also varies the angle of incidence of the filter to the light as the filter moves through the light path. As the angle of incidence of the light to the filter varies, the wavelength of the light transmitted through the filter varies. Thus, as each of the filters passes through the light path, the wavelength of light incident on the test sample sweeps through a range of values. The instrument detects the intensity of the reflected or transmitted light at specific selected positions of the paddlewheel to measure differences in the optical density of the test sample. This technique of measuring the constituents of test samples has proved to be very accurate.

SUMMARY OF THE INVENTION

The present invention is an improvement over the instrument disclosed in the above mentioned patent in that instead of mounting the interference filters in a paddlewheel arrangement, the filters are mounted on a wheel in a drum arrangement with each filter facing generally toward the axis of the wheel. A light source is positioned adjacent to the wheel and light from this source is directed by the lens onto a mirror positioned adjacent to the axis of the wheel. The mirror reflects the light in a beam passing through the cylindrical locus on which the filters are positioned to the test sample. As the wheel rotates, the filters are moved in sequence into the light path between the mirror and the test sample and as each filter moves through the light path, the angle of incidence of the light to the filter varies. Thus, as in the paddlewheel arrangement of the Webster patent, the wavelength of light incident on the test sample is varied through a range of values as each filter passes through the light path. The drum arrangement is advantageous over the paddlewheel arrangement because more filters can be mounted for sequential rotation into the light path and the drum arrangement facilitates making the angular position of each filter adjustable. In the paddlewheel arrangement, the angular position is fixed and it would be difficult, if not impractical, to make the angular position of each filter adjustable. As a result, in the paddlewheel arrangement, the angle of incidence of the light to the filter sweeps between fixed limits so that the wavelength transmitted by each filter sweeps between fixed limits. In the drum arrangement, by making the angular position of each filter variable, the limits of the range of the angle of incidence of the light to the filter can be varied and thereby the range of values through which the wavelength transmitted by each filter varies can be adjusted.

DESCRIPTION OF PREFERRED EMBODIMENTS

Figure 1:
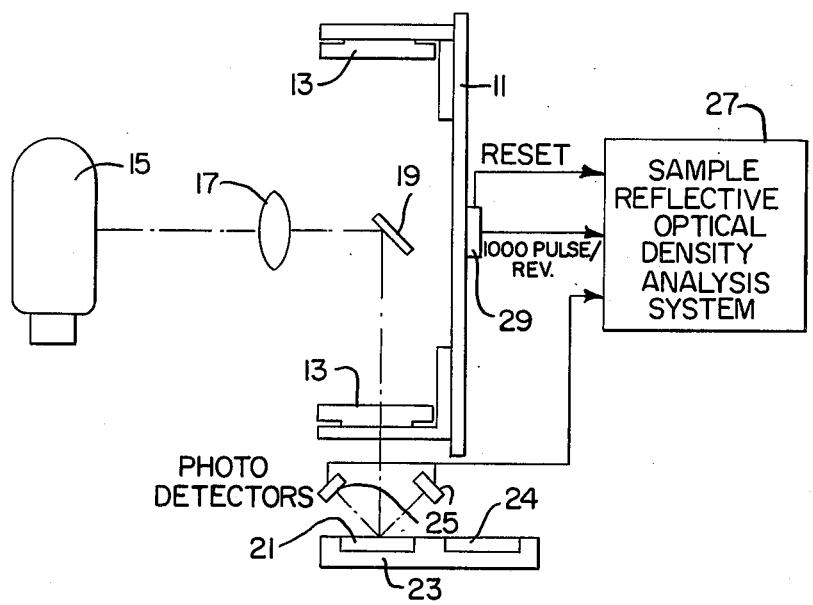
FIG. 1 schematically illustrates an embodiment of the present invention in which the system responds to reflected light from the sample and thus analyzes the test sample from measurements of reflective optical density.

In FIG. 1, the reference number 11 designates a wheel on which six interference filters are mounted distributed about the axis of the wheel and all generally facing the axis of the wheel. Only two of the filters, designated by the reference number 13, are visible in FIG. 1. Wideband visible light from a source 15 is focused into a columnated beam by a lens 17 and reflected by a mirror 19 to pass through the cylindrical locus on which the filters 13 are positioned. The light beam reflected by the mirror 19 impinges upon a sample 21 located in a sample drawer 23 in the same manner as disclosed in the above mentioned Webster patent. The sample drawer 23, in addition to containing a test sample 21, contains a standard sample 24. The drawer has two positions, one in which the test sample 21 is in the path of the light reflected from the mirror 19 and the other in which the standard sample 24 is in the path of the reflected light. As disclosed in the above mentioned patent, when the standard sample 24 is in the path of the light beam, the analysis system 27 is automatically calibrated for any variation in the intensity of the light to make accurate measurements on the test sample when the test sample is in the path of the incident light. Light reflected from the sample 21 or 24 is detected by photodetectors 25 which apply an electrical signal corresponding to the intensity of the reflected light to an analysis system 27. During operation, the wheel 13 rotates continuously to bring the filters 13 sequentially into the light beam extending between the mirror 19 and the sample in the path of the light beam. Each of the interference filters 13 is designed to pass a different selected wavelength of light when the light passing through the filter is normal to the plane of the filter. The wavelength transmitted by each filter, however, will vary depending upon the angle of incidence of the light to the plane of the filter. As each filter moves through the beam of light extending between the mirror 19 and the sample, the angle of the filter to the incident light varies continuously and, as a result, the wavelength transmitted by the filter changes and is swept through a range of values. As the wheel 11 rotates, a decoder 29 produces pulses at a rate of 1,000 pulses per revolution and a reset pulse once per revolution. In response to these pulses, the system 27 samples outputs from the photodetectors 25 at specific angular positions of the wheel 11 and, thus, at specific selected wavelengths incident upon the sample in the path of the light beam. As stated in the above mentioned Webster patent, the outputs are sampled at a plurality of predetermined times during the sweep of each filter through the light path. Since each predetermined time corresponds to a different angle of the filter relative to the light path and, therefore, to a different transmitted wavelength, the outputs of the photodetectors can be and are sampled at a plurality of different wavelengths incident upon the test sample during a single sweep of the filter. In response to these detected reflected intensities, the system 27 analyzes the test sample. For example, it determines the oil, protein and water content of a grain sample. The details of an exemplary analysis system 27 are disclosed in the above mentioned Webster patent.

Figure 2:
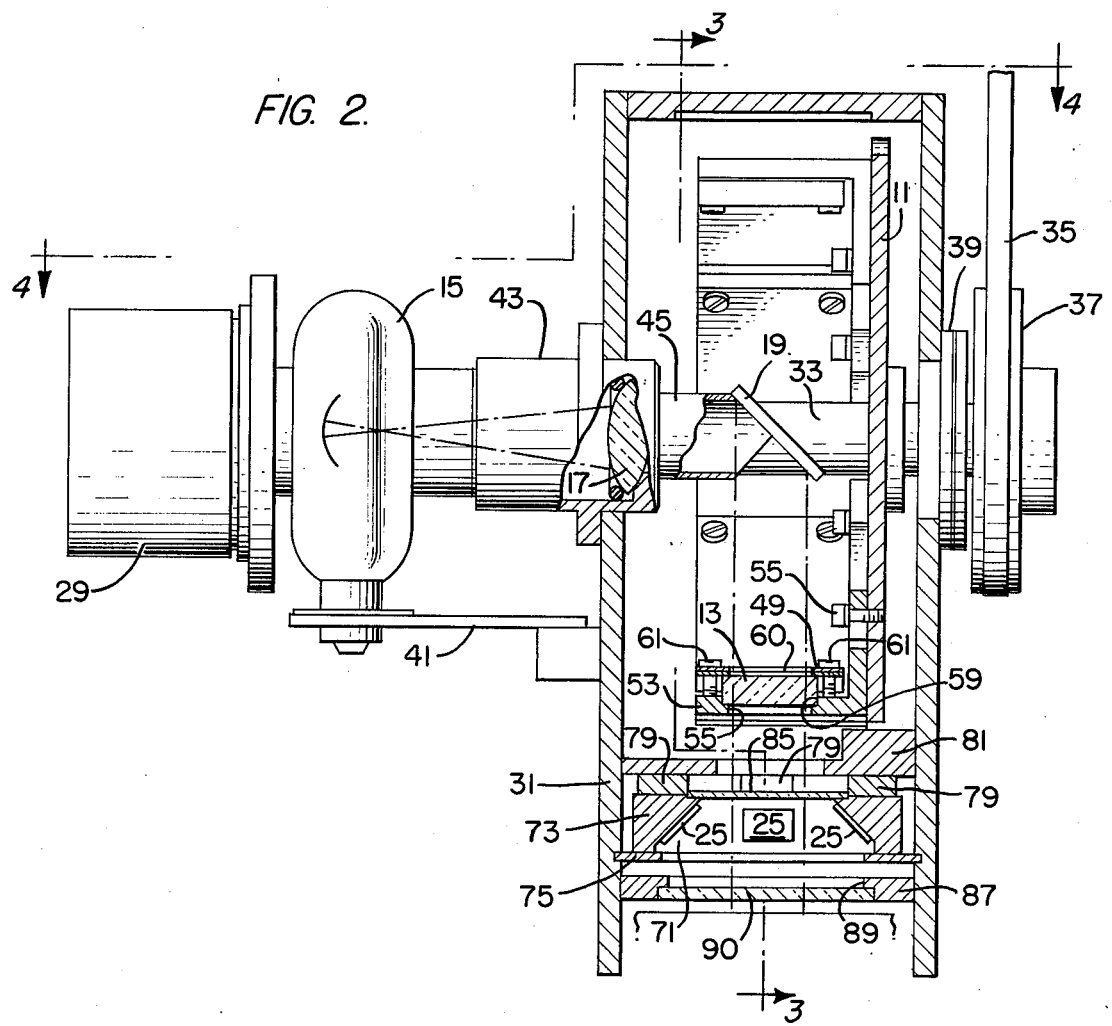
FIG. 2 is a sectional view in elevation of the optical portion of the system of FIG. 1 showing the filter and photocell arrangement.
Figure 3:
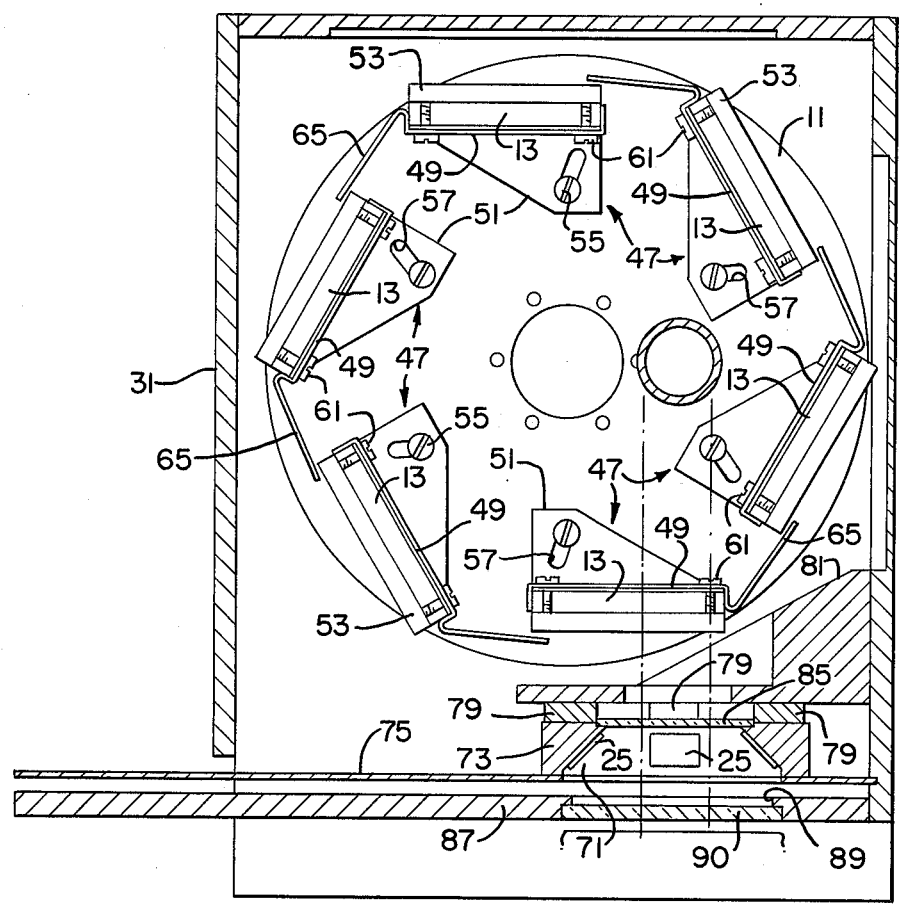
FIG. 3 is a sectional view taken along the line 3—3 of FIG. 1.
Figure 4:
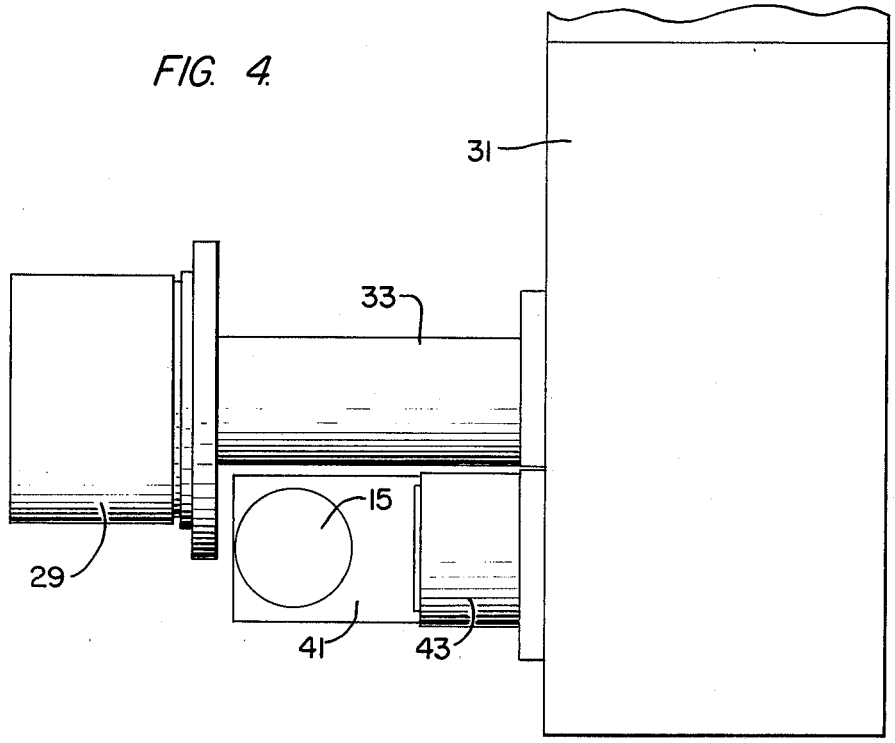
FIG. 4 is a top plan view of the assembly shown in FIGS. 2 and 3.

As shown in FIGS. 2-4, the wheel 11 is mounted in a housing 31 on a shaft 33, driven by a belt 35 and a pulley 37. The shaft 33 is supported in the housing 31 between the pulley 37 and the wheel 11 by a bearing 39. The end of the shaft 33 opposite from the pulley 37 is coupled to the decoder 29 which generates the thousand pulses per revolution and the one reset pulse per revolution of the wheel 11. During operation, the belt 35 and the pulley 37 drive the wheel 13 to rotate it at a continuous speed in order to move the filters 13 sequentially into the light path between the mirror 19 and the sample drawer 23.

The lamp 15 is mounted on a bracket 41, which in turn, is supported on the housing 31. The lens 17 is mounted in a lens housing 43, which in turn, is mounted in an opening in the housing 31 between the source 15 and the mirror 19. The housing 43 is cylindrical and the end thereof facing the lamp 15 is provided with an aperture to limit the amount of light from the source 15 impinging upon the lens 17. The mirror 19 is fixed to the end of a tube 45, mounted on the housing 43 coaxial with the housing 43. The end of the tube 45 adjacent to the mirror 19 is cut away at its bottom to let the columnated beam of light reflected by the mirror to pass unobstructed down toward the sample drawer 23. The mirror 19 is oval to reflect a circular beam of light.

Figure 5:
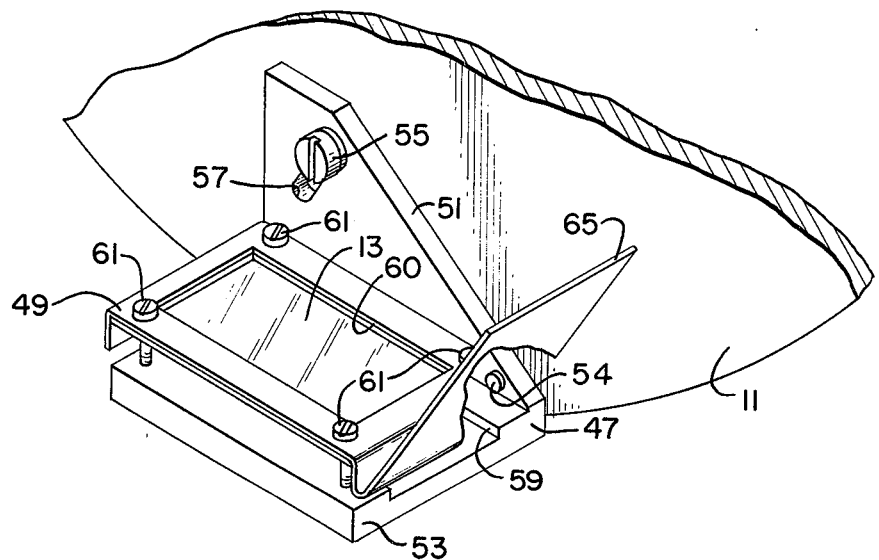
FIG. 5 is a perspective view illustrating a portion of the system of FIG. 2 showing the details of how a filter is mounted on the wheel of the system.

As best shown in FIGS. 3 and 5, each interference filter is mounted on the wheel 11 by means of a mounting assembly comprising a support 47 and a bracket 49. The support 47 has a triangular shaped leg 51 mounted on the wheel 13 by means of a pin 54, about which the support 47 may pivot, and a screw 55 passing through an angular slot 57 in the leg 51 and tapped into the wheel 11. The support 47 has extending perpendicularly to the leg 51 a pedestal 53 which is provided with a rectangular aperture 55 in the middle and U-shaped recess 59 extending throughout the length of the pedestal 53 in which the interference filter 13 is positioned. The bracket 49 is a thin plate provided also with a rectangular aperture 60 in the middle thereof and fits over the top of the filter 13. Four screws 61 pass through the bracket 49 and are screwed into the four corners of the pedestal 53 to hold the filter 13 securely in place on the mounting assembly. The bracket 49 folds over both ends of the filter 13 to hold the filter 13 secure against movement in a direction tangential to the arc of filter movement. The U-shaped recess 59, in which the filter 13 fits, secures the filter against movement in a direction perpendicular to the plane of the wheel 11. At one end of the bracket 49, the folded over portion is provided with an extension in the form of a planar opaque plate 65 bent at an angle from the folded over portion so as to be generally perpendicular to the radius of the axis of the wheel 11. The extension 65 extends over to just below the adjacent filter mounting assembly on the wheel 13 as best shown in FIG. 3. The function of the opaque plate 65 is to block the light between the mirror 19 and the sample drawer 23 in the angular intervals between the filters so as to provide a dark period during which the electronic circuit in the system 27 is reset in accordance with the photocell output as described in the above mentioned Webster patent.

The angular position of the filters 13 on the wheel 11 can be adjusted through ten degrees by means of the screw 55, the slot 57 and the pivotal mounting on the pin 54. Simply by loosening the screw 55, the assembly can be pivoted about the pin 54 to the desired angular position and the screw 55 retightened to hold the assembly, and thereby the filter, in a new selected angular position.

The photocells 25 are mounted on the sidewalls of a truncated conical chamber 71. There are four photocells and they are equally angularly distributed about the axis of the chamber which is aligned with the circular columnated light beam from the mirror 19. The chamber 71 is defined by block 73 mounted on a plate 75 which is mounted in slots in the opposite sidewalls of the housing 31. The conical chamber 71 extends through the block 73 to provide circular openings at the top and bottom thereof. The plate 75 is similarly provided with a circular opening slightly smaller than the opening at the bottom of the block 73 and coaxial with the beam of light reflected by the mirror 19. Mounted on top of the block 73 are four thermoelectro cooling elements 79, one directly above each of the photocells 25 functioning to maintain the photocells at a selected temperature. Mounted on top of the cooling elements 79 is a thermally conducting member 81 serving to provide a heat sink for the system to help maintain the photocells at an even temperature. The heat sink 81 is also provided with an aperture coaxial with the beam of light reflected from the mirror 19 and selected to be only slightly larger than the beam to reduce the amount of stray light entering into the chamber 71.

The opening in the top of the block 73 is closed by a transparent pane 85 fitting in a recess surrounding the aperture in the top of the block 73. Between the sample drawer 23 and the chamber 71 is a plate 87 provided with an aperture 89 coaxial with the beam of light reflected by the mirror 19. The plate 87 is provided with a recess at the bottom thereof surrounding the aperture 89 and in which is fitted a transparent pane 90. The transparent panes 85 and 90 serve to prevent foreign matter from getting into the chamber 71.

As each filter 13 is rotated into the light beam, light from the mirror will pass through the filter to the test sample or standard sample positioned beneath the chamber 71 and light from the test or standard sample will be reflected back up through the aperture 89 to be detected by the photocells 25.

Figure 6:
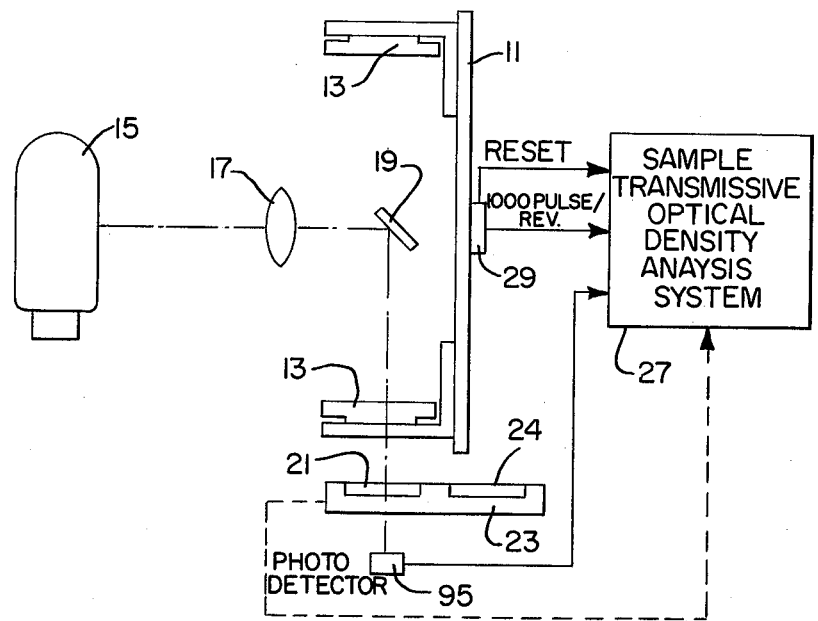
FIG. 6 is a schematic illustration of an alternative embodiment of the system of the present invention responding to light transmitted through a test sample and analyzing the test sample from transmissive optical density.

The alternative embodiment schematically illustrated in FIG. 6 is just like the embodiment illustrated in FIG. 1 except that a photodetector cell 95 is located beneath the sample drawer to detect light transmitted through the test sample or the standard sample instead of being located above the tray to detect light reflected from the sample. The sample tray, of course, has to be apertured beneath the positions for the test sample and the standard sample to permit transmission of light therethrough.

As described above, the system of the present invention provides a system in which six filters are brought sequentially into the light path impinging upon the test sample instead of three as in the above described patent. The system permits six filters to be employed instead of three as in the above described patent because the filters are positioned in a drum arrangement instead of a paddlewheel arrangement. In addition, the drum arrangement described makes it feasible to provide for the filters to be angularly adjustable through ten degrees thus permitting adjustment of the limits through which each filter sweeps the wavelength of transmitted light.

The above description is of a preferred embodiment of the invention and many modifications may be made thereto without departing from the spirit and scope of the invention, which is defined in the appended claims.

I claim:

1. An optical analysis system comprising a plurality of interference filters, means for mounting said interference filters at positions disposed generally on a cylindrical locus, each said filter having a surface disposed perpendicularly to a plane defined by said locus and facing the axis of said locus, means for rotating said filters about the axis of said locus, means for providing a beam of light passing in a radial direction through said cylindrical locus whereby said filters are rotated in sequence through said beam of light, each said filter adapted to transmit a range of wavelengths of said light as it is rotated through said beam, means for positioning a test sample in said beam of light after it has passed through said cylindrical locus, photodetecting means to detect light from said beam after said light has come into optical contact with said test sample, and to provide a signal indicative of said detected light, and means responsive to said signal only at a plurality of predetermined times as each said filter is rotated through said light beam to determine a characteristic of said sample, each said predetermined time corresponding to a different wavelength within the variable wavelength range transmitted by said filter during its rotation through said light beam.

2. An optical analysis system as recited in claim 1, wherein said photodetecting means are positioned to detect light reflected from said test sample.

3. An optical analysis system as recited in claim 1, wherein said photodetecting means is positioned to detect light passing through said test sample.

4. An optical analysis system as recited in claim 1, wherein said means to provide a light beam directs said light beam outwardly through said cylindrical locus.

5. An optical analysis system as recited in claim 4, wherein said means to provide a light beam comprises a light source, and a mirror positioned within said cylindrical locus to direct light from said source outwardly through said cylindrical locus to said test sample.

6. An optical analysis sytem as recited in claim 5, wherein there is provided means to focus light from said source into a beam and direct said beam onto said mirror.

7. An optical analysis system as recited in claim 1, wherein said means to mount said interference filters and rotate said filters comprises a rotor and providing means for adjustment of the angular position of said filters on said rotor.

8. An optical analysis system as recited in claim 1, wherein said means to mount said filters and rotate said filters comprises a wheel, and a filter supporting means for each of said filters for mounting said filters to extend perpendicularly from the plane of said wheel, each of said filter supporting means having a leg pivotally attached to said wheel, a slot defined in said leg, and a screw passing through said slot and tapped into said wheel, said screw and said slot permitting angular adjustment of said filter supporting means about the pivot axis of the pivotal attachment of said leg to said wheel when said screw is loosened and fixing the angular position of said filter supporting means on said wheel when said screw is tightened.

9. An optical analysis system as recited in claim 1, wherein said means for mounting and rotating said interference filters comprises a rotor including a pedestal supporting each of said filters, said pedestals being distributed about the axis of said rotor and a bracket holding said filters in position on said pedestals, said brackets each having an opaque extension extending over to the adjacent pedestal to block the light beam in the angular intervals between said filters.

* * * * *